J. WOODWARD.
Ore Mill.
No. 19,807.
Patented March 30, 1858.
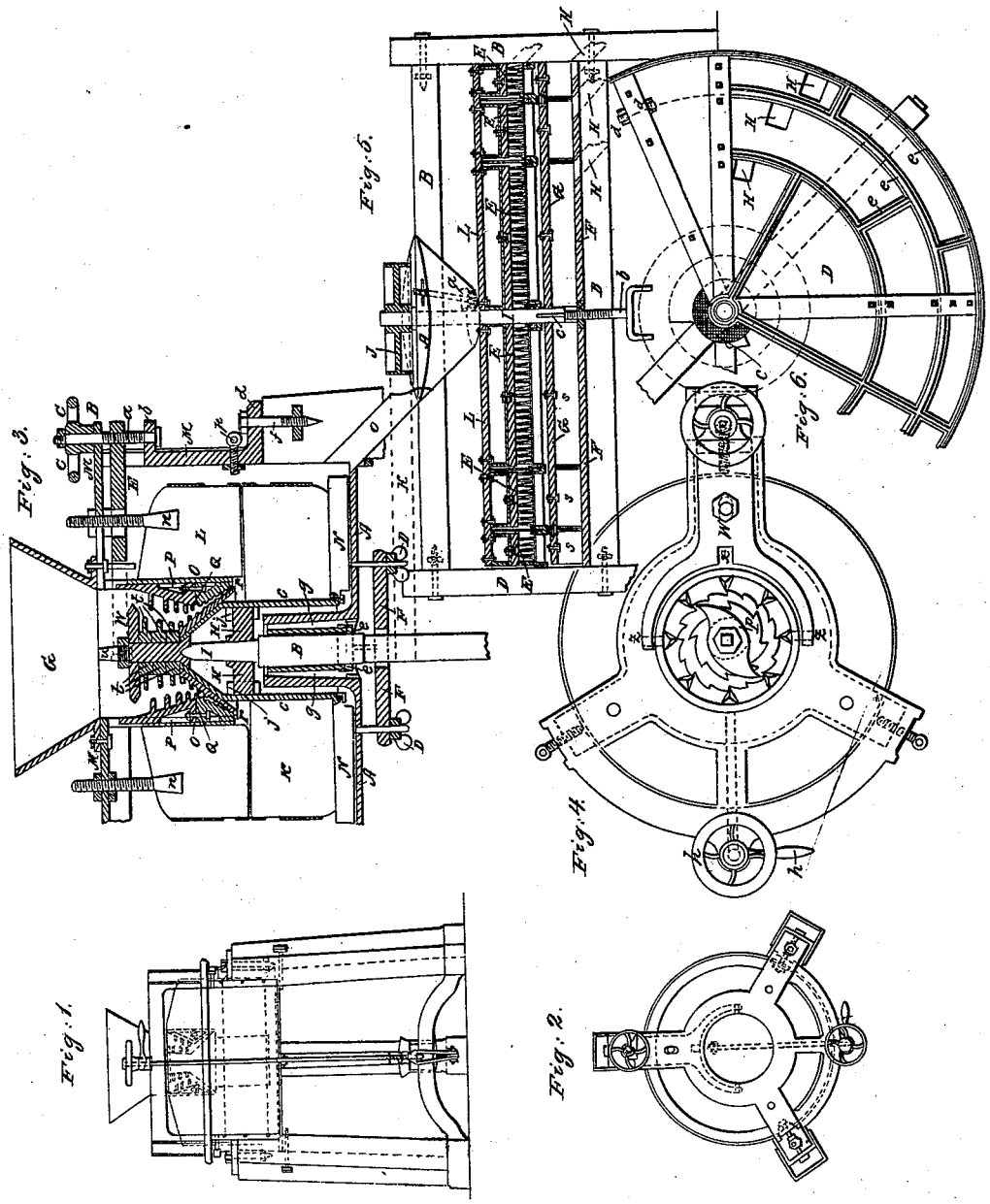

UNITED STATES PATENT OFFICE.

JOEL WOODWARD, OF PHILADELPHIA, PENNSYLVANIA.

MILL.

Specification of Letters Patent No. 19,807, dated March 30, 1858.

*To all whom it may concern:*

Be it known that I, JOEL WOODWARD, of Philadelphia, in the county of Philadelphia, in the State of Pennsylvania, have made a new and useful Improvement in Mills for Crushing and Grinding Grain and other Substances to Flour or Meal; and I do hereby declare that the following is a full and exact description of the construction and operation of the same, reference being had to the accompanying drawings, and to the letters of reference marked thereon, making a part of this specification, in which—

Figure 1 is a perspective view, Fig. 2 a top view, Fig. 3 center cut, showing the construction of the crusher or breaker, balance rynd, driver and bush, or upper bearing of spindle, Fig. 4, a top view of the plate and the lever to be attached to the crusher or breaker.

The nature of my invention or improvement consists, 1st, in the construction of the iron shell, in the upper stone, with movable inside pot or teeth, by which the feed of the stones and the grinding of the crusher can be regulated; 2d, the construction or application of the nuts to the balance rynd in the lower stone, thus saving power and machinery; 3d, the balancing of the lower stone on the top of the spindle by which the face of the stones can be brought together the same as when the upper stone is balanced and driver working inside, and near the top of the balance rynd; 4th, the bush on top of the middle plate and running up inside of the balance rynd by which it brings the upper bearing of the spindle near the top of it, and also keeps it free from dirt, which other spindles are subject to, making the whole machinery simple, compact, cheap and portable for the grinding of all substances to be reduced to meal or flour.

To enable others skilled in the art to make, construct and use my invention, I will now proceed to describe its construction, and operation in detail.

Letters A, A, Fig. 3, is the middle plate with the bush or upper bearing of spindle B, attached to it, and running up inside of the balance rynd C, C, with followers which can be tightened at pleasure by screws D, D, which have a board F F resting on them.

e, e, is a ring with two feet attached to it resting on the board F F. It being raised by the screws D, D, forces the wedges or followers g, g, up and tightens the spindle B.

H, H, is the driver on the upper end of the cockhead of the spindle B, and bears against the inside brackets or cleats j, j, on the inside of the balance rynd C, C, which works free and drives the lower stone K, K. The upper stone L, L, is fastened to an iron frame M, M, M, by bolts and set screws n, n, n, and has an iron shell o, o, fastened in the eye with slots or grooves P, P, for the lugs or pins of the inside pot or teeth Q, Q, to move up and down, thus opening and closing the aperture r, r, to regulate the feed of the stones, and the grinding of the breaker or crusher.

S, is an iron bolt passing through the top of the balance rynd, C, C, with a center in the end of it for the cockhead of spindle B to rest in and passing up through the nuts t, t, t, t, with a screw nut, w, on the top to keep them fast.

v, is the lower nut which is a shell that drops on the top of the balance rynd C, C, that can be removed by taking off the nuts t, t, t, t, and replaced at pleasure.

W, W, in Figs. 3 and 4, is the lever with a slot x in the center of the fork that rests on a fulcrum y, y, supported by top plate M, M, M, with two slats in the ends of the forks z, z, for the lugs, or pins of the inside pot or teeth Q, Q, to work in, and passing through the leg of the top M, at E, with a screw passing through it.

b, b, b, are bearings for the screw a with a hand wheel c, c, to raise or lower the inside pot or teeth Q, Q. The hopper G, may be fastened to the top of the iron frame M, M, M, which is fastened on to wooden posts J, by joint bolts.

N, N, are scrapers fastened to the under side of the lower stone K, K, to throw out the substance ground.

O, is the spout.

What I claim as my invention and desire to secure by Letters Patent is—

1. The mode of the brush, Fig. 3 on the plate A, A, running up inside of the balance rynd C, C, in the manner and for the purpose set forth.

2. And the mode of the lower stone K, K working on a loose or balance rynd C, C, that has a nut or breaker v, v, resting on or fastened to the top of it, and may work with or without a balance or upper bearing as set forth.

3. And the manner of the inside pot or teeth Q, Q, made to raise and lower to open and close the aperture $r$, $r$, by means of the lever W, (or screw) to regulate the feed of the stones and grinding of the crusher or breaker in the manner and for the purpose set forth to be used in connection with the foregoing specification.

JOEL WOODWARD.

Attest:
JOHN HOLLINGSHEAD,
LEVERETT BALL.